United States Patent [19]

Feinleib et al.

[11] 3,906,462

[45] Sept. 16, 1975

[54] OPTICAL STORAGE DEVICE USING PIEZOELECTRIC READ-OUT

[75] Inventors: Julius Feinleib, Cambridge; Stephen G. Lipson, Belmont, both of Mass.

[73] Assignee: Itek Corporation, Lexington, Mass.

[22] Filed: May 4, 1973

[21] Appl. No.: 357,290

[52] U.S. Cl.. 340/173 LS; 340/173 LM; 340/173.2; 340/173 MS

[51] Int. Cl. .......... G11c 11/42

[58] Field of Search ... 340/174.1 M, 173.2, 173 TP, 340/173 LS, 173 LM; 179/100.41 J, 100.41 P

[56] References Cited

UNITED STATES PATENTS

| | | | |
|---|---|---|---|
| 2,776,339 | 1/1957 | Arni | 340/173 TP |
| 2,985,866 | 5/1961 | Norton | 340/173 TP |
| 3,055,006 | 9/1962 | Dreyfoos | 340/173 TP |
| 3,732,549 | 5/1973 | Barkely | 340/173.2 |
| 3,792,449 | 2/1974 | Kazan | 340/173 CR |

*Primary Examiner*—Terrell W. Fears
*Attorney, Agent, or Firm*—Homer O. Blair; Robert L. Nathans; David E. Brook

[57] ABSTRACT

Apparatus and methods are described which utilize the dimensional changes of a piezoelectric material in response to an electric field impressed thereacross to retrieve optically an information pattern. In a preferred embodiment, a crystal such as bismuth germanium oxide is used because it has both a photoconductive, field-storage capabiltiy and a large piezoelectric effect. Information can be read into such a material optically, stored by means of a spatially varying internal electric field impressed thereacross, and subsequently optically read-out using the piezoelectric effect. Read-out is accomplished by sensing the modulation of read-out light caused by surface deformations on the crystal due to the internal electric field.

16 Claims, 2 Drawing Figures

OPTICAL STORAGE DEVICE USING PIEZOELECTRIC READ-OUT

BACKGROUND OF THE INVENTION

1. Field of the Invention

This invention is in the field of optically readable devices and more particularly in the field of optically readable devices which contain information in the form of a spatially varying electric field.

2. Description of the Prior Art

Many solid state, optical read-out electronic storage devices have been described in the prior art. Typically, these devices store a spatially varying electric field which is representative of information. These devices often use ferroelectrets, thermoelectrets, photoconductive, field-storage materials (sometimes referred to as "photoelectrets,") thermoplastic deformation imaging, photoplastics, etc.

Various ways have been proposed to read information out of these storage devices. Generally, the read-out techniques include electronic sensing techniques and optical sensing techniques, the latter having many advantages which are well documented in the literature.

One suitable optical read-out technique, which has been particularly advantageous with photoconductive, field-storage materials, uses an electro-optic material for read-out. The electro-optic medium is associated with the storage medium so that a spatially varying field is impressed across the electro-optic medium. Light is then transmitted or reflected from the electro-optic medium, and the modulation imposed by the electro-optic medium is sensed. Typically, plane polarized light is directed to the electro-optic material, and the rotation of the plane of polarization is sensed as an indication of the varying electric field, which in turn is representative of information stored in the device. Such an electro-optic read-out technique is described in more detail in the patent and scientific literature in such places as Oliver, U.S. Pat. No. 3,517,206 and Oliver, D.S. and Buchan, W.R., "An Optical Image Storage and Processing Device Using Electro-Optic ZnS," *IEEE Transactions on Electron Devices*, pp. 769–773, September, 1971.

Although the electro-optic read-out technique described above has many advantages over electronic sensing techniques, it too suffers from certain limitations. Many times, for example, it is critical, albeit difficult, to match the properties of two layers in such devices. For example, the resistivities of the photoconductive and electro-optic materials have to be carefully chosen and matched. Additionally, the capacitances and coefficients of thermal expansion often need to be matched. Also, it is usually essential to have uniform continuous contact of the crystal faces and to minimize electrical junctions at the interface. Read-out can be inefficient with such devices because the light is required to pass through one or two material layers, and sometimes through an interface between layers. Non-destructive read-out of this type of device can be achieved only with a very limited range of wavelengths, i.e. those wavelengths not absorbed by the photoconductor. Read-out can also be limited to low intensity light levels to avoid carrier generation.

There has been a continuing need, therefore, for a simple, efficient optical read-out technique and apparatus useful for sensing spatially varying electric fields in devices as described above.

SUMMARY OF AN EMBODIMENT OF THE INVENTION

In one embodiment, this invention relates to the use of a piezoelectric material for optically retrieving information stored in the form of a spatially varying electric field. This is accomplished by optically sensing surface deformations resulting from dimensional changes at each point location of the piezoelectric material in response to the spatially varying electric field.

A light readable device can be constructed by combining a piezoelectric medium, which undergoes a dimensional change in response to an electric field impressed thereacross, with a medium containing such a spatially varying electric field. Light can be reflected from an opaque surface of the piezoelectric material, and modulation of the light can be sensed as a representation of information. In a preferred embodiment, materials which have a piezoelectric effect and which are photoconductive, field-storage materials are used.

A method for reading information out of a device with a spatially varying electric field thereacross is also accomplished using piezoelectric materials. In this case, the piezoelectric material is placed in electrical contact, and preferably in continuous face-to-face relationship, with the medium, whereby a field is impressed across the piezoelectric material. Modulations of read-out light can be detected as described in more detail below.

As will be appreciated, the read-out technique and apparatus of this invention overcome many problems and/or limitations of prior read-out techniques and apparatus. It can be seen, for example, that the requirement of matching crystals, loss of read-out efficiency because read-out light must pass through interfaces or through one or more crystals, and the limitation to non-destructive wavelengths are all obviated. Since read-out light doesn't have to pass through the piezoelectric material, very intense read-out light may be used.

DESCRIPTION OF PREFERRED EMBODIMENTS

Figure 1:
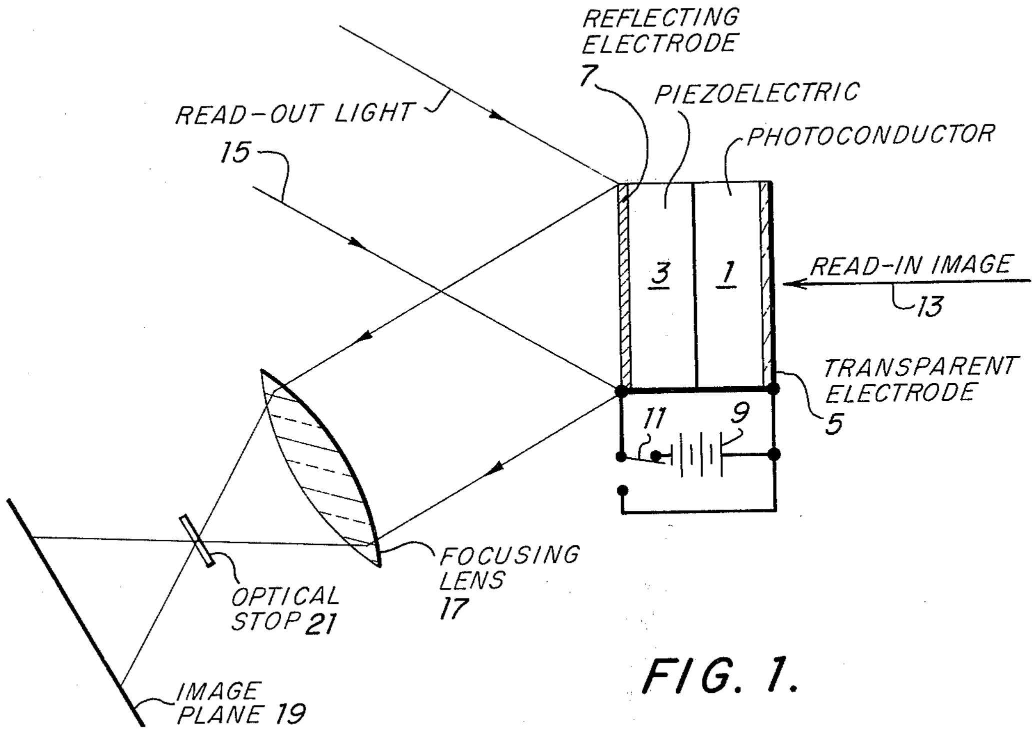
FIG. 1 is a schematic illustration of an optically readable device of this invention formed from a piezoelectric layer and a separate photoconductive layer.

Referring now to the Figures in more detail, FIG. 1 illustrates a device formed from a photoconductor material 1 and a piezoelectric material 3 sandwiched between transparent electrode 5 and reflecting electrode 7. Transparent electrode 5 can be formed on the read-in side of the device by evaporating a thin, transparent conductive film of platinum, indium oxide, etc. onto the surface of photoconductor 1. Reflecting electrode 7 can be formed by evaporating an opaque reflecting film such as aluminum onto the read-out side of piezoelectric material 3. Preferably, the reflecting electrode 7 is just thick enough to be reflecting, but not thick enough to mask piezoelectric deformations of material 3. Suitable thicknesses for reflecting electrode 7 are about 0.01–1 micrometers.

Battery 9 is connected to electrodes 5 and 7 to provide a Constant voltage across the device when switch 11 is in the position shown. The position of switch 11 can be changed to short circuit the device.

A spatially varying electric field can be created across the device by illuminating photoconductor material 1 with read-in image 13 while a constant electric field is applied across the device by battery 9. At illuminated areas, the resistivity of photoconductor 1 will be reduced substantially whereas the restivity remains constant at non-illuminated areas. Normally, of course, the resistivity of most photoconductors drops by several orders of magnitude under illumination--this is not required, however, since much smaller changes provide sufficient differences in the electric field across a piezoelectric material to provide optical read-out capability. Thus, another advantage of the devices described herein is the wide choice of photoconductors which can be used.

The spatially varying field created across piezoelectric layer 3 is representative of read-in image 13. Consequently, piezoelectric layer 3 undergoes dimensional changes directly related to the strength of the electric field impressed thereacross at each discrete point.

A read-out technique is illustrated which produces a direct, visible, intensity-modulated image of surface-relief patterns present on the surface of reflecting electrode 7, which, of course, are caused by dimensional changes of piezoelectric layer 3. Reflecting electrode 7 is illuminated with collimated read-out light 15, which can be coherent or incoherent. As read-out light 15 strikes reflecting electrode 7, it is modulated according to the dimensional changes present in piezoelectric material 3. Focusing lens 17 is used to image the modulated light pattern onto image plane 19. An optical stop 21 is inserted at the focal plane of lens 17 to provide a dark ground optical read-out technique. Optical stop 21, can be, for example, a transparent slide with an opaque spot thereon which spot is positioned at the focal point of lens 17.

Other optical elements can be substituted for stop 21. As an example, a transparent quarter wave spot can be used to provide a phase contrast read-out technique; additionally, a half plane knife edge could be used for a Schlieren read-out technique. Further, if read-out light 15 were conically collimated, a quarter wave ring could be substituted for stop 21. These and other similar optical techniques are well known to those skilled in the art who will be able to determine the exact specifications of these elements using no more than routine experimentation.

Good contrast in the read-out image can be obtained if the surface deformations of the piezoelectric material are on the order of $\lambda/4$. This is controllable by choosing an appropriate voltage in view of the specific properties of the piezoelectric material. For example, in a crystal of piezoelectric bismuth germanium oxide, an applied voltage of about 1000 volts provides the proper order of magnitude of surface deformations.

As mentioned above, a wide range of photoconductor materials can be used. These include inorganic photoconductors such as cadmium sulfide, zinc sulfide, zinc selenide, zinc oxide, lead sulfide, etc., and organic photoconductors such as polyvinylcarbazoles, phthalocyanines, etc.

Storage can be achieved by choosing a photoconductor which has a field-storage capability such as zinc selenide, etc. Alternatively, the relative restivities of the photoconductor and piezoelectric materials can be chosen so that the piezoelectric material acts as a blocking layer to provide storage. In storage devices, it may be desirable to add an insulating layer, such as parylene, between photoconductor 1 and electrode 5 which appears to prevent charge injection.

If the device does provide storage capability, it can be erased by flooding the photoconductor 1 with absorbed uniform radiation while placing switch 11 in a short-circuiting position, or by reversing the field across the device.

Suitable examples of piezoelectric materials include barium titanate, bismuth silicon oxide and bismuth germanium oxide crystals, and piezoelectric ceramics such as PZT. Some materials, such as crystals of bismuth germanium oxide and bismuth silicon oxide, have both a large piezoelectric effect and good photoconductive, field-storage capability. These are preferred materials for use in this invention because of these and of other outstanding properties including suitable bandgaps and resistivities.

Figure 2:
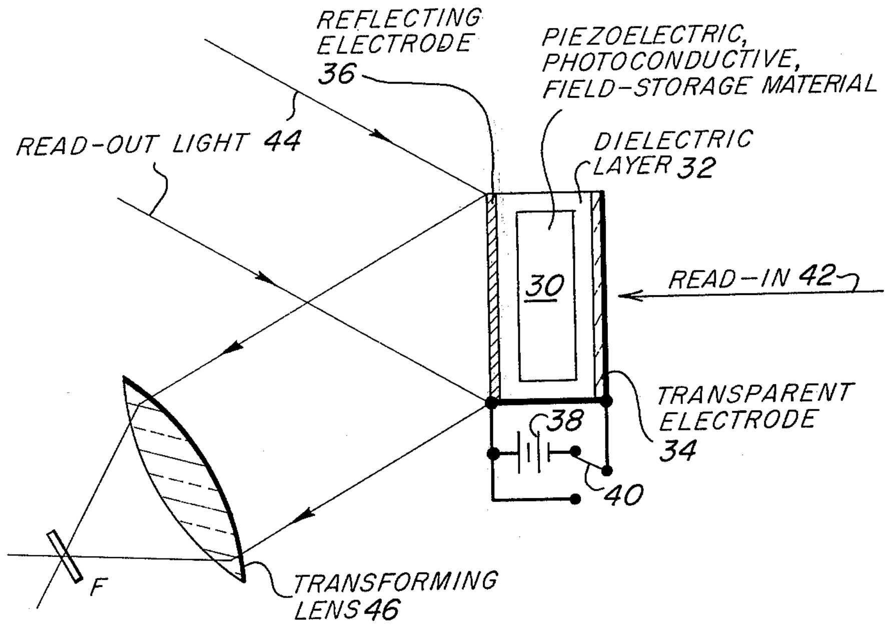
FIG. 2 is a schematic illustration of an optically readable device of this invention formed from a single layer of piezoelectric, photoconductive, field-storage material.

A device capable of storing a spatially varying internal electric field is illustrated in FIG. 2. The heart of this device is piezoelectric, photoconductive, field-storage material 30. Thus, one material contributes all of the properties necessary to read optical information into the device, store information therein, and to read information out optically using the piezoelectric read-out technique described herein.

As mentioned above, examples of piezoelectric, photoconductive, field-storage materials are bismuth germanium oxide and bismuth silicon oxide crystals. The crystals should be oriented in the direction having the maximum longitudinal piezoelectric effect, such as the (111) direction for bismuth germanium oxide. Using one material as shown in FIG. 1 obviates all crystal matching problems.

As shown, crystal 30 is surrounded by an insulating dielectric layer 32, which may be a parylene layer, licensed by Union Carbide. Commonly, these dielectric layers are about 1–10 micrometers thick, whereas the bismuth silicon oxide or bismuth germanium oxide can be about 200–1000 micrometers thick. The thicknesses are chosen to give a good balance of resolution, the required voltage, sensitivity, and contrast.

Remaining elements of the device shown in FIG. 2 are similar to those previously described for the device in FIG. 1. Thus, the device has a transparent electrode 34 positioned on the read-in side of the device and a reflecting electrode 36 positioned on the read-out side of the device. Battery 38 applies a constant voltage across the device when switch 40 is in the position shown. Additionally, the position of switch 40 can be changed to short circuit the device. Since crystal 30 is photoconductive, read-in can be accomplished by illuminating the crystal with read-in light image 42 while a uniform field is applied by battery 38. After read-in image 42 is turned off, and the device short circuited, the read-in information is stored.

An optical diffraction method is illustrated for sensing the dimensional changes of crystal 30 due to the internal electric field stored therein. Read-out light 44, which in this case should be well collimated and temporally coherent, if reflected from the electrode 36. The reflected, modulated read-out light passes through transforming lens 46 and is observed directly in the focal plane. This observed light distribution is a representation of the Fourier transform of the surface-relief variations created in crystal 30 by the internal electric field impressed thereacross. This form of read-out is suitable for spectrum analysis, correlation and other such applications.

Those skilled in the art will recognize many equivalents to the techniques and apparatus specifically described herein. For example, devices have only been illustrated in which read-in is accomplished optically using materials such as photoconductors; it is, of course, possible to read a spatially varying electric field into the piezoelectric material by electrical or other methods. Additionally, many piezoelectric or photoconductive materials can be substituted for those specifically mentioned. In fact, materials other than piezoelectric materials can be used—the essential characteristic being that the material undergoes dimensional changes or surface deformation in response to the strength of an electric field impressed across the material at each point location. Electrostrictive crystals, may, for example, be used. Also, those skilled in the art will know or be able to ascertain by no more than routine experimentation other optical methods to sense the dimensional changes of materials in response to electric fields impressed thereacross. The battery shown in the Figures illustrates in principle how a field may be applied, but in practice a programmable voltage sequence would probably be used. It might be, for instance, that a positive voltage pulse would be applied during read-in while a negative pulse would be applied during erase. In regard to read-out, any of the techniques specifically illustrated and/or described, as well as others, can be used with any of the devices described. All such equivalents are intended to be covered by the following claims.

What is claimed is:

1. A light readable device comprising:
a. a piezoelectric medium which undergoes dimensional change in response to an electric field impressed thereacross;
b. means for impressing an electric field across said piezoelectric medium, said electric field being representative of information;
c. means for illuminating said piezoelectric medium with read-out light; and,
d. means for sensing modulations of the read-out light caused by dimensional changes in said piezoelectric medium.

2. A device of claim 1 wherein said means for impressing an electric field includes a photoconductive medium, means for impressing an electric field across said photoconductive medium and said piezoelectric medium, and means to illuminate said photoconductive medium with a pattern of light representative of said information.

3. A device of claim 2 wherein said means for illuminating with read-out light comprises means for reflecting collimated light from the surface of said piezoelectric medium.

4. A device of claim 3 wherein said photoconductive medium and said piezoelectric medium comprise separate materials positioned in electrical contact with each other.

5. A device of claim 4 wherein said photoconductive medium and said piezoelectric medium are positioned in a contacting, continuous, face-to-face relationship.

6. A device of claim 5 wherein said device has the capability of storing the electric field representative of information.

7. A device of claim 6 wherein said photoconductive medium has field-storage capability.

8. A device of claim 6 wherein said piezoelectric medium serves as a blocking layer to store an internal electric field thereacross.

9. A device of claim 2 wherein said photoconductive medium and said piezoelectric medium comprise the same material.

10. A device of claim 9 wherein said photoconductive, piezoelectric medium comprises bismuth silicon oxide or bismuth germanium oxide.

11. A device of claim 10 having an insulating layer on each side of the piezoelectric, photoconductive, field-storage material.

12. A storage device comprising:
a. a piezoelectric, photoconductive, field-storage medium;
b. a reflecting electrode positioned on the read-out side of said medium;
c. an insulating layer in intimate contact with one face of said medium;
d. a transparent electrode positioned on the read-in side of said medium; and,
e. means to apply a voltage across said medium.

13. A device of claim 12 wherein said piezoelectric, photoconductive, field-storage medium comprises bismuth silicon oxide or bismuth germanium oxide.

14. A device of claim 13 having an insulating layer positioned between said reflecting electrode and said piezoelectric, photoconductive, field-storage medium.

15. A device of claim 13 having an insulating layer positioned between said transparent electrode and said piezoelectric, photoconductive, field-storage medium.

16. A device of claim 13 having insulating layers positioned between both of the reflecting electrode and the transparent electrode and said photoconductive, piezoelectric, field-storage material.

* * * * *